United States Patent [19]

Dotsko

[11] Patent Number: 4,850,631
[45] Date of Patent: Jul. 25, 1989

[54] ARTICLE MANIPULATOR

[76] Inventor: Martin Dotsko, 40 Helen St., Binghamton, N.Y. 13905

[21] Appl. No.: 53,010

[22] Filed: May 22, 1987

[51] Int. Cl.[4] ............................................ B25J 15/12
[52] U.S. Cl. : ...................... 294/86.4; 294/88; 294/907; 414/7; 414/730; 901/21; 901/35
[58] Field of Search ............... 414/680, 7, 730, 629, 414/744 A, 753, 757, 783; 901/21, 27, 35; 623/64; 294/86.4, 88, 99.1, 111, 119.3, 907

[56] References Cited

U.S. PATENT DOCUMENTS

| | | | |
|---|---|---|---|
| 1,324,564 | 12/1919 | Pringle | 623/64 |
| 2,733,545 | 2/1956 | Guadagna | 623/64 X |
| 3,413,658 | 12/1968 | Becker | 623/64 |
| 4,330,284 | 5/1982 | Dotsko et al. | 324/61 P X |
| 4,351,553 | 9/1982 | Rovetta et al. | 414/7 X |
| 4,541,771 | 9/1985 | Beni et al. | 901/35 X |
| 4,629,385 | 12/1986 | Irie | 414/744 A X |

Primary Examiner—Robert J. Spar
Assistant Examiner—Donald W. Underwood
Attorney, Agent, or Firm—Richard G. Stephens

[57] ABSTRACT

Application of tension simultaneously to three cords extending through respective coil springs and attached off the axes of the springs causes movement of tactile members on the ends of the springs to grasp, lift and rotate a workpiece. A capacity sensitive sensor positions the coil assembly relative to the object so that the tactile members will grasp the workpiece in a uniform manner irrespective of workpiece size.

10 Claims, 4 Drawing Sheets

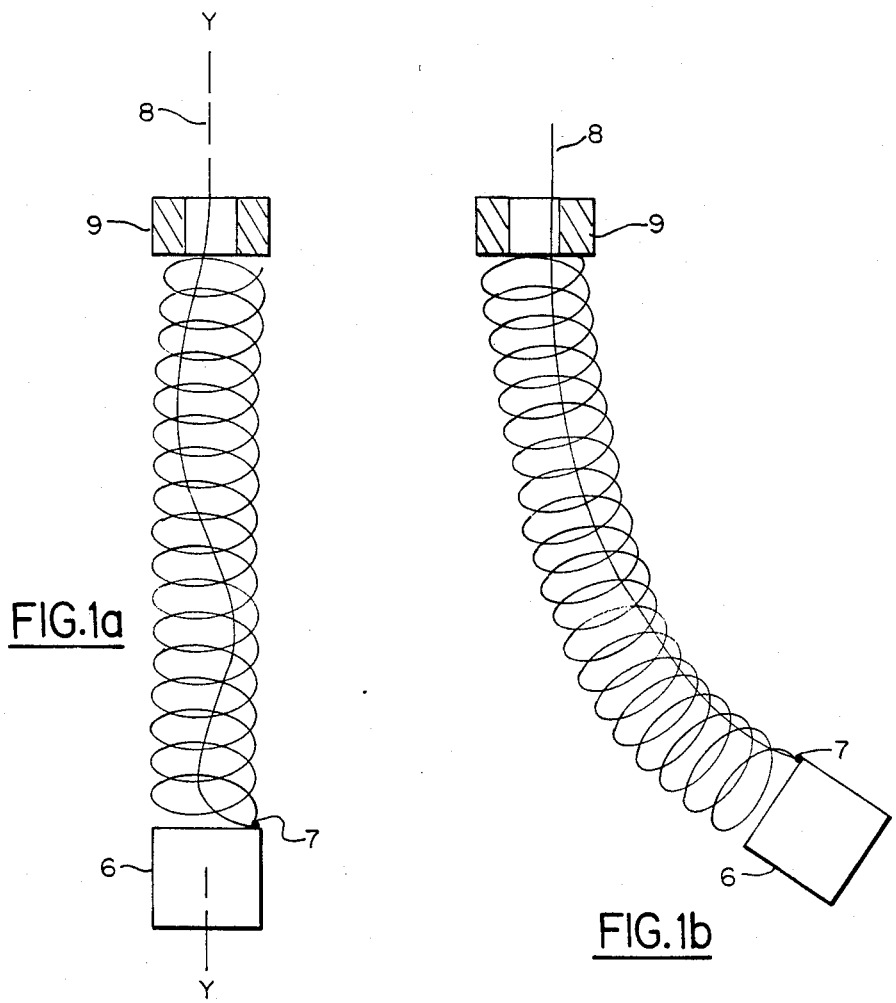
FIG.1a
FIG.1b
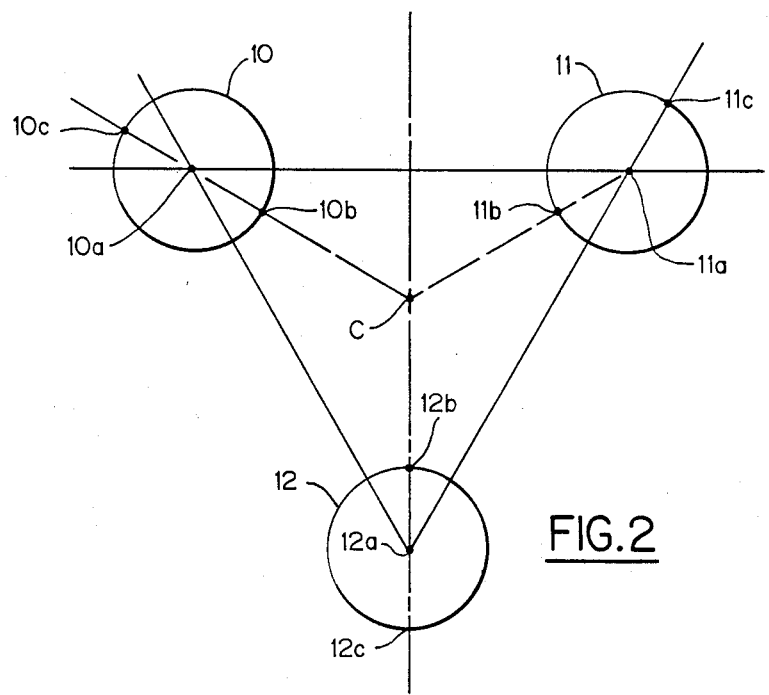
FIG.2

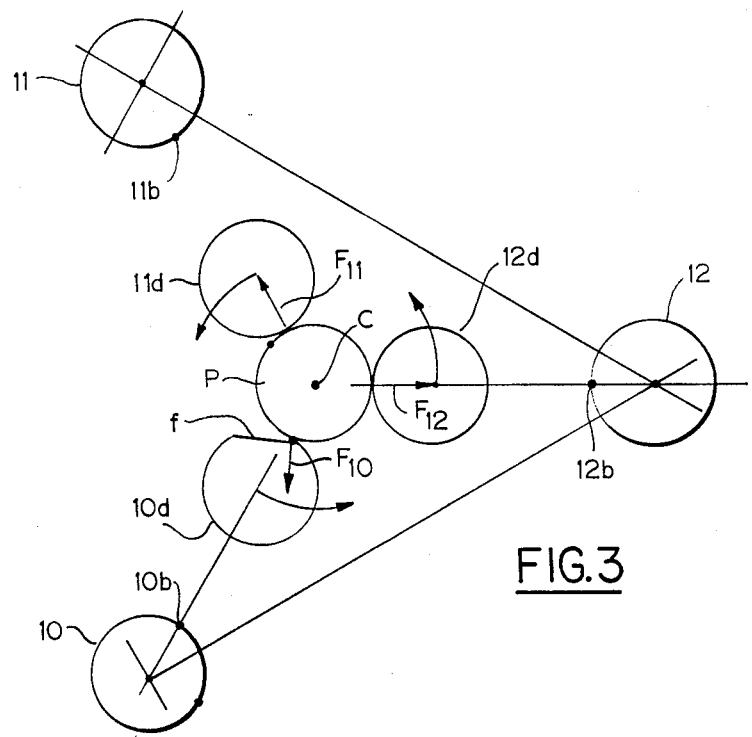
FIG. 3
FIG. 4
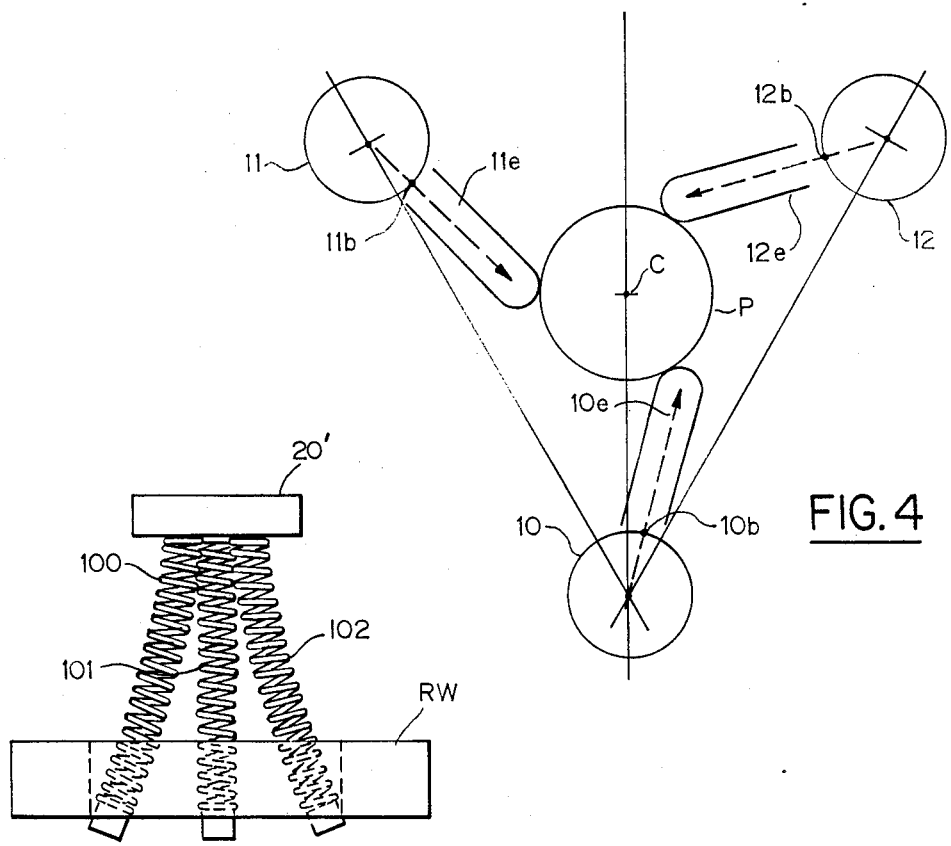
FIG. 7

ARTICLE MANIPULATOR

The present invention relates to article manipulators, and more particularly, to simplified devices capable of performing various functions of the human hand, including grasping and lifting various articles.

Broadly described, the invention contemplates deformation of a coil spring by means of a cord or wire extending inside the coil spring to simulate operation of a finger. The principle of applying tension to a wire or cord which extends inside a coil spring to simulate operation of a finger is not new, and is disclosed in U.S. Pat. Nos. 1,324,564 (Pringle), 1,929,926 (Laherty), and 2,733,545 (Guadagna). In each of those patents a means for stiffening each coil spring is used, in order to confine movement of an end of the spring to a predetermined path within a single plane toward an object to be grasped. Such stiffening means undesirably increase the pulling force required to bend the coil spring. Unlike the devices of the mentioned patents, the present invention attaches the wire or cord to the coil spring at a point offset from the relaxed longitudinal axis of the coil spring, so that lesser pulling force is required to bend the end of the coil spring along a path toward an object to be grasped. Importantly, after the object has been grasped, the ends of the coil springs are caused to bend or deflect from their prior paths toward the object, and in essence to pursue paths around the object, resulting in a lifting and rotating of the object.

In numerous robotic applications it is desirable that various successive objects be grasped and lifted at one location and moved to a second location where one or more operations may be performed on such objects. It is often desirable that the objects be returned to the first location after the operation is performed.

Prior art devices capable of grasping and lifting an object have tended to be quite complicated. An important object of the invention is to provide an article manipulator in which a single simple mechanical input will provide both a grasping and a lifting of a workpiece.

Another object of the invention is to provide a manipulator which will grasp and lift objects of many different sizes, without previous adjustment for a predetermined size.

In some applications it is desirable that a workpiece be grasped and held with substantial grasping forces while it is moved, while in some other applications it is preferable that the workpiece be cradles and moved without subjecting it to large gripping forces. Another object of the invention is to provide a manipulator which is useful in both such types of applications.

One more specific object of the invention is to provide an article manipulator which only requires application tension simultaneously to three cords in order to grasp and lift a workpiece.

Another object of the invention is to provide an article manipulator system having capacity-sensing apparatus fitted to an article manipulator in order to provide an accurate initial positioning of the manipulator relative to a workpiece prior to operation of the manipulator to grasp and lift a workpiece.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIGS. 1a and 1b are diagrammatic views of a coil spring-cord assembly.

FIGS. 2, 3 and 4 are plan view diagrams useful in understanding standing how a trio of coil springs may be actuated to grasp, lift and rotate a workpiece.

FIG. 7 is an elevation view of a portion of one modified form of the invention.

FIG. 8b is a view taken at lines 8b—8b on FIG. 8a.

Figure 5:
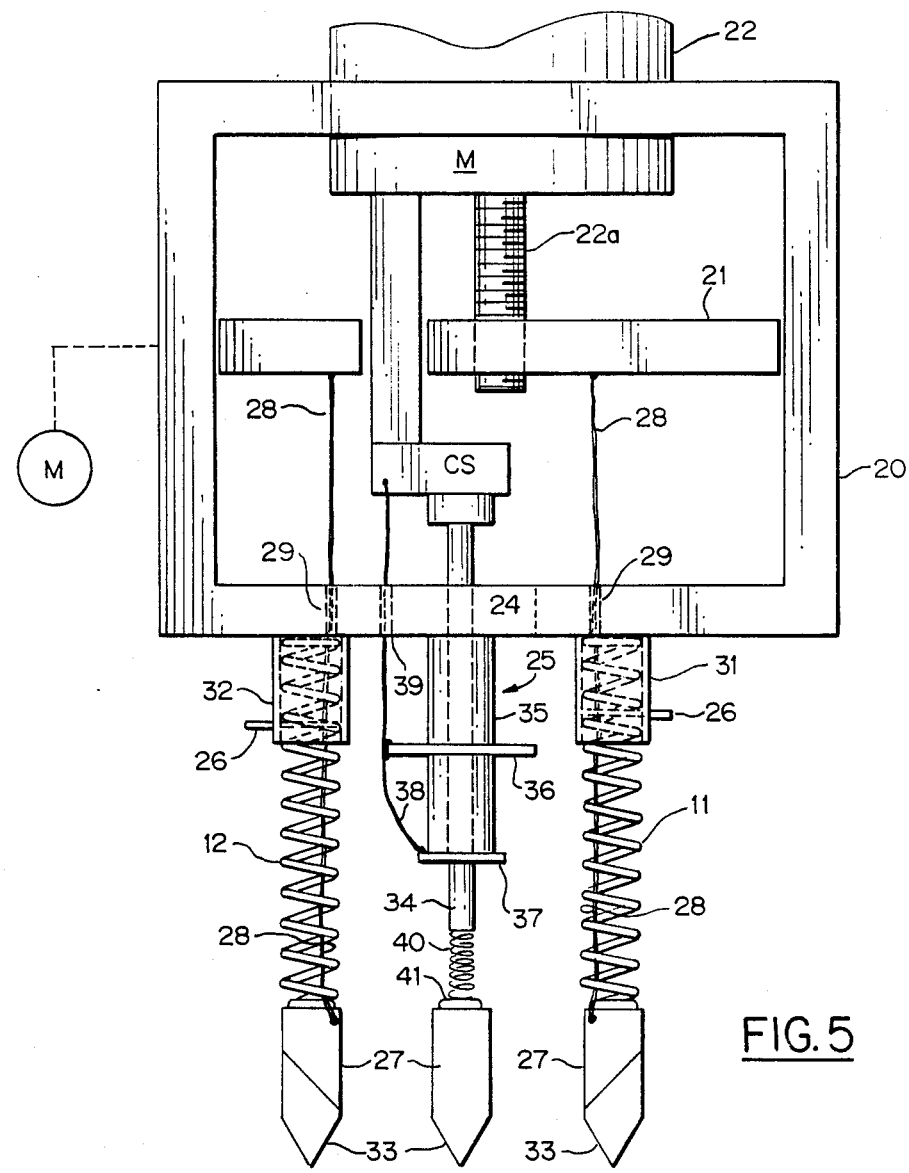
FIG. 5 is an elevation view of one exemplary embodiment of the invention.

A thorough understanding of the principles of the present invention will be facilitated by an initial reference to FIGS. 1a and 1b. In FIG. 1a a cylindrical coil spring 5 is shown with its upper end affixed to a base member 9. In its relaxed condition the spring extends along a vertical axis y—y. A tactile member 6, such as a piece of rubber, is shown attached to the lower end of the spring. A cord 8 is attached to one turn of the spring at the lower end thereof at point 7, shown at the right hand edge of the spring in FIG. 1a. The cord may be attached either to a lower turn of the spring, or to the adjacent tactile member, in either case at a point radially displaced from the coil axis. Cord 8 extends upwardly inside the spring, through a hole in member 9. If base member 9 is held fixed and an upward pull is exerted on cord 8, adjacent turns of the spring move closer together on the right-hand side of the spring and further apart on the left hand side of the spring, causing the spring to curve to a shape of the nature shown in FIG. 1b. Thus tension in the cord causes the lower end of the spring and the tactile member to move in an arc which progresses rightwardly and upwardly. Such motion may be continued by application of increasing tension until adjacent turns on the right side touch each other. When tension is removed, the spring returns to the configuration shown in FIG. 1a. It will be appreciated by reason of symmetry, that if cord 8 instead were attached to the left side of the bottom end of the spring, applying tension to cord 8 would cause the tactile member to move leftwardly and upwardly.

In the plan view diagram of FIG. 2 three coil springs 10, 11 and 12 are shown spaced apart from each other so that their relaxed axes 10a, 11a and 12a lie at respective corners of an equilateral triangle. The upper ends of the coil springs are assumed to be fixedly attached to a base member (now shown). Assume that respective cords extending down within the springs are attached at points 10b, 11b and 12b at the lower ends of the springs. Those attachment points each lie on a line extending between the relaxed axis of a spring and the center C of the equilateral triangle. As increasing tension is applied to the cords, it will be apparent from the prior discussion of FIGS. 1a and 1b that the attachment points at the lower ends of the springs all will move toward point C, as well as swinging upwardly. Each attachment point swings inwardly and upwardly within a respective plane. Now assume instated that the cords are attached to the coil springs at 10c, 11c, and 12c. Then as increasing tension is applied to the cords, the attachment points at the lower ends of the springs will move away from point C, along the lines shown, as well as swinging upwardly, again each within a respective plane.

In the plan view diagram of FIG. 3, circles at 10, 11 and 12 again represent the upper ends of a trio of vertically-extending coil springs, those ends being shown spaced at the corners of an equilateral triangle, and assumed to be affixed to a rigid arm member (not shown). The centers of circles 10-12 correspond to the relaxed axes of the springs. Points 10b, 11b and 12b represent the points at which respective cords (not shown) are attached to a lower end of each spring. The three coil springs are assumed to have identical characteristics. It will be understood from the prior discussion of FIGS. 1a, 1b and 2, that if tensions are applied to the cords, the lower ends of the springs each will move toward the center C of the equilateral triangle, as well as moving somewhat upwardly (i.e., normal to plane of the paper in FIG. 3).

In FIG. 3 a workpiece P of cylindrical configuration is assumed to be lying loosely at the center C of the equilateral triangle. Three tactile members assumed to be attached to the lower ends of the springs are represented at 10d, 11d, 12d, each just touching workpiece P. Hence FIG. 3 assumes that a given amount of tension has been applied to the three cords, moving the tactile members into engagement with the workpiece.

Each of the tactile members is assumed to be slightly compressible, formed of rubber, for example. It should be noted that members 11d and 12d are each shown with a circular periphery, but that member 10d is shown provided with a flat face f. Assume, for a moment, however, that member 10d also has a completely circular periphery. With that assumption it will be apparent that applying increased tension to the cords would merely result in the three tactile members being urged with more force against the workpiece. With three members symmetrically disposed about the workpiece and applying equal forces directed toward the center of the workpiece a balance of forces would exist, with no movement of the workpiece.

However, with flat face f provided on member 10d, as increasing cord tension causes the compressible member 10d to be urged more tightly against the workpiece, the reaction force which the workpiece applies to member 10d becomes not directed toward the relaxed axis of spring 10, but rather in a direction perpendicular to face f, in a direction such as that shown by arrow $F_{10}$, for example. With such an imbalance of forces it will become apparent that member 10d will begin to move counterclockwise about the periphery of the workpiece. As soon as member 10d begins to move counterclockwise, that results in imbalances of the forces applied to member 11d and 12d, causing them to similarly move counterclockwise about the periphery of the workpiece, until a new balance of forces is established. As the tactile members move counterclockwise about the workpiece, moving the lower ends of the springs horizontally further away from underneath the fixed tops ends of the springs, that necessarily causes the lower ends of the springs and the tactile members to rise. Thus the application of increased cord tension after the tactile members engage the workpiece causes the tactile members to lift and rotate the workpiece.

In FIG. 3, the attachment points at the lower ends of the springs each swing inwardly and upwardly in a respective plane until the tactile members engage the workpiece, but thereafter the lower ends move along different paths in different planes as the workpiece is lifted and rotated. In order to provide such lifting and rotation, it is necessary that bending of the coil springs not be constrained to occur in single respective planes.

In FIG. 4 the cord attachment points 10b, 11b and 12b are displaced from lines extending between the relaxed axes of the springs and the center C of the equilateral triangle, and a modified form of tactile member is attached to the lower end of each spring, such members being shown at 10e, 11e and 12e. With the cord attachment points so displaced, as increasing tension is initially applied to the cords, the tactile members do not move toward center C of the triangle, but rather in the directions of the dashed-line arrows shown. FIG. 4 illustrates the condition at which enough tension has been applied to the three cords for the tactile members to just engage workpiece P. If the cord tension is further increased, it will become apparent that the tactile members will continue to be urged against the workpiece, but each slightly rotated in a clockwise direction as well as moving upwardly. Each of the coil springs may be wound in a direction such that the rotation of its associated tactile member tends to wind up the spring, thereby causing further lifting of the tactile members and the workpiece.

Because the tactile members swing upwardly as well as moving horizontally as tensions are applied to the cords, a workpiece to be grasped and lifted often must initially be located at a vertical level somewhat above that of the bottoms of the tactile members when the cord tensions are relaxed, and workpieces may be laid atop a variety of different types of pedestals.

Using either the technique of FIG. 3 or that of FIG. 4 in order to grasp rotate and lift a workpiece, one next may move the spring-trio article manipulator to a desired location, and then one may gradually relax the tensions applied to the cords, causing the workpiece to be lowered and rotated the same distance with opposite rotation from that which it was earlier lifted and rotated, and then released. It will be apparent that a spring-trio article manipulator may be mounted on an arm to be swung or translated horizontally or vertically, or with any desired component of motion.

Referring to FIG. 5, an article manipulator thereshown comprises a hollow box-like base member 20 having a plate 21 mounted therein for sliding vertical movement of plate 21. Plate 21 is shown mounted on threaded shaft 22a of an electric motor 22, so that rotation of motor 22 moves plate 21 upwardly and downwardly. As will be seen below, upward movement of plate 21 applies equal tensions to three cords to cause deflection of three coil springs. It will be mentioned at the outset that use of a motor is by no means necessary, and numerous different techniques for simultaneously applying substantially equal tensions to cords in plural coil springs will be used in different applications of the invention.

Box member 20 may be mounted on an arm (not shown), and as diagrammatically indicated in FIG. 5, a motor M may be provided to raise and lower member 20 relative to a surface on which a workpiece is situated.

Motor M may be operated to lower the manipulator assembly of FIG. 5 with the coil springs relaxed until capacitance exceeding a predetermined threshold value is sensed by a capacity sensor assembly, indicating that the tip of a probe of the sensor assembly is a predetermined distance, within a small tolerance, from the workpiece. motor M is then stopped, and the tactile members 33, 33 then will lie at known vertical positions with respect to the workpiece. Next, motor 22 is operated to raise plate 21, applying tension to the three cords 28, 28.

While three coil springs 10, 11 and 12 are mounted on the bottom of base member 20 in an equilateral triangular configuration, coil spring 10 is omitted from FIG. 5 to afford a view of a capacitance sensor assembly which is centrally located with respect to the equilateral triangle. The bottom of base member 20 carries three guide tubes into which the ends of respective coil springs are mounted, the guide tubes for coil springs 11 and 12 being shown at 31, 32, and a similar guide tube being provided for coil spring 10. Each coil spring is held in place against the bottom of member 20 by a pin 26 press-fitted into its respective guide tube. The lower end of each coil spring carries a respective non-metallic pad 27 permanently attached to the lower end of the spring, as by cementing. A respective cord 28 is shown attached to each pad 27, offset from the relaxed axis of the coil spring. It will be apparent that the lower end of each cord could be attached to the spring itself rather than to the nearby pad 27. In either situation, the attachment point is offset from the relaxed axis of the coil so that application of tension to cords 28 causes the lower ends of the springs and their pads 27 to move toward the center of the equilateral triangle on whose corners the upper ends of coil springs 10-12 are spaced. Each cord 28 extends from near the bottom of its respective spring upwardly inside its respective spring, and through a respective hole or bore 29 in the bottom of member 20, to where it is tied to movable plate member 21. The cords 28 are shown slack in FIG. 5 for each identification, but they ordinarily will be arranged not to be slack. Attached to each non-metallic pad, as by means of cementing, is a gum rubber tactile member, or "fingertip" 33. When motor 22 is rotated to move plate 21 upwardly, tensions are simultaneously applied to the three cords 28, causing the tactile members to move toward the center of the equilateral triangle, as well as upwardly, so that the fingertips will grasp, rotate and lift a workpiece (not shown) located at the center of the equilateral triangle. In order to provide rotation and lifting of the workpiece, one tactile member of the manipulator of FIG. 5 may be provided with a noncircular face portion to provide operation of the type described in connection with FIG. 3, or, alternatively, the tactile members may be similar, with the spring deflection directions arranged to provide operation of the type described in connection with FIG. 4.

The capacitance sensor 25 comprises a central electrical insulator 24, an electrically conductive rod 34 affixed to insulator 24 and extending through an insulating tube 35, a first or upper conductive biasing ring 36 encircling insulator tube 35, and a second conductive biasing ring 37 encircling tube 35 at its lower end. A wire 38 electrically connected to biasing rings 36 and 37 extends upwardly through a hole or bore 39 in the bottom of member 20 and connects to the signal ground terminal of a capacity-sensitive switch CS. The upper end of a small compression spring 40 is attached to the lower end of rod 34, and a small metallic pad 41 is affixed to the lower end of spring 40. The capacity-sensitive switch CS is screwed onto the threaded upper end of probe rod 34. Switch CS may comprise, for example, a Series 7053 capacity limit switch available from Automatic Timing & Controls, Inc. of King of Prussia, Pa. In one embodiment of the invention, switch CS was connected via a Series 7212 controller-amplifier (not shown) to control stopping of motor M.

After a workpiece has been grasped by the tactile members, and during a terminal portion of while it is being rotated and lifted, the workpiece engages pad 41 and compresses spring 40. The workpiece then will be seen to be held in place not only by the three tactile members, but also by the force applied by spring 40 via metal pad 41.

It is often desirable that known or predetermined locations on the fingertips engage a workpiece being grasped, irrespective, within limits, of the size and shape of the workpiece. Thus it is, in turn, desirable to control motor M so that the manipulator is lowered to a proper distance above a workpiece before tension is applied to the manipulator cords to grasp and lift the workpiece. Distance of the manipulator from the workpiece is defined as the vertical distance between metal pad 41 and the workpiece, and that distance is measured by sensing the capacitance seen by the tip of the probe. Determining distance by sensing capacitance has the advantage over various other distance measuring techniques that it tends to not depend upon physical characteristics of the workpiece other than a dimension, for a given type of material.

Figure 5A:
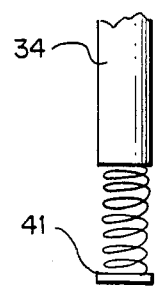
FIGS. 5a and 5b are geometric views useful in understanding the use of capacitive sensing to provide initial location of an article manipulator to a workpiece.
Figure 5B:
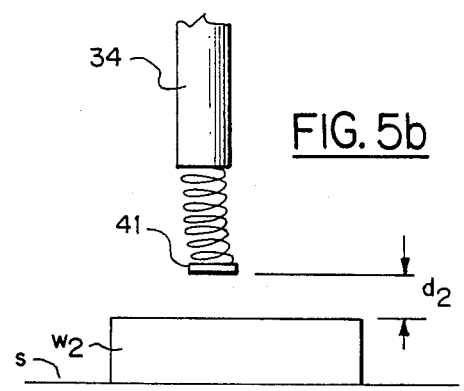

In FIG. 5a pad 41 of the sensor assembly is shown located distance $d_1$ above a workpiece $W_1$ lying on a surface S, and under such a condition a given capacitance exists between pad 41 and workpiece $W_1$ lying on a surface S. If motor M is arranged to stop moving the manipulator toward the workpiece when that value of capacitance is detected, the pad 41 obviously may be positioned distance $d_1$ from workpiece $W_1$. However, if a wider workpiece of the same height is used, such as workpiece $W_2$ of FIG. 5b, that value of capacitance will occur when pad 41 is a greater distance (shown as $d_2$) above the workpiece, and hence merely measuring the capacitance seen by pad 41 will not result in uniform positioning of the manipulator. In order to provide substantially uniform positioning of the manipulator relative to workpieces of various shapes and sizes, two added capacitances which also vary with the position of the manipulator, but which vary much less, due to their greater distances from the workpiece, are shown provided by means of biasing rings 36 and 37. In some applications of the invention which use capacitive sensing, different numbers of biasing rings may be used, depending upon the range of widths of workpieces to be manipulated. The technique of providing biasing surfaces to provide precise detection of position is not per se new, and is shown in my prior U.S. Pat. No. 4,330,284. The sizes and positions of the biasing rings may be determined using the principles and formulas set forth in that patent. In one embodiment of the invention the probe 34 was 0.52 inches in diameter. The lower biasing ring 37 had an outer diameter of 0.254 inches, an inner diameter of 0.187 inches, and it was positioned approximately 0.30 inches upwardly from the lower end of probe 34. The upper biasing ring 36 had an outer diameter of 0.345 inches, an inner diameter of 0.250 inches, and it was positioned 0.60 inches up from the lower end of probe 34. Both rings had a thickness of 0.03 inches.

Figure 6:
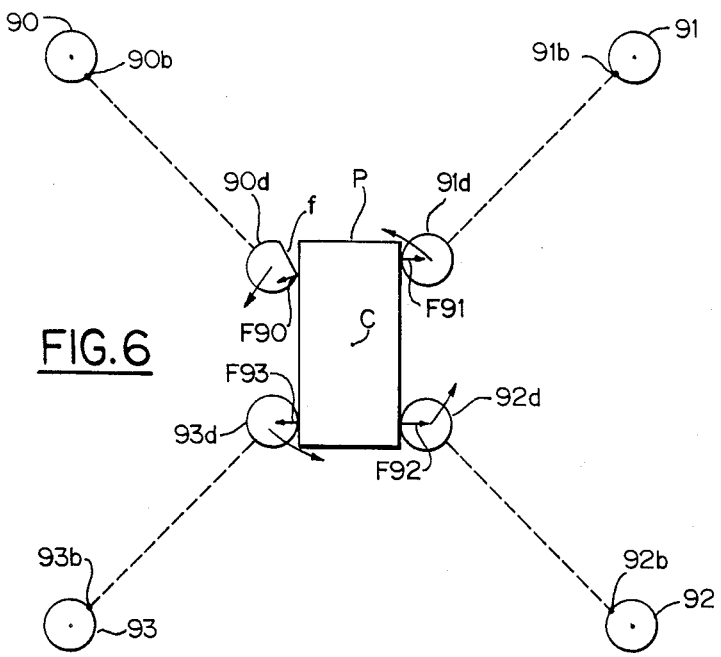
FIG. 6 is a plan view diagram useful in understanding how a quartet of coil springs may be used to grasp, lift and rotate a workpiece.

While the use of three coil springs spaced at corners of an equilateral triangle has been described in connection with various of the Figures, and while manipulators using such an arrangement is presently a preferred form of the invention, it is important to note that more than three springs may be used in some applications. FIG. 6 is a view similar to FIG. 3, but showing four coil springs with respective lower tactile members engaging a rectangular workpiece in order to rotate and lift it.

In the plan view diagram of FIG. 6 circles at 90, 91, 92 and 93 again represent the upper ends of a quadrate of vertically-extending coil springs, those ends being shown spaced at the corners of a square and assumed to be affixed to a rigid arm member (not shown). The centers of circles 90-93 correspond to the relaxed axes of the springs. Points 90b, 91b, 92b and 93b represent the points at which respective cords (not shown) are attached to a lower end of each spring. The four coil springs are assumed to have identical characteristics. It will be understood from the prior discussion of FIGS. 1a, 1b and 2, that if tensions are applied to the cords, the lower ends of the springs each will move toward the center C of the rectangle, as well as moving somewhat upwardly (i.e., normal to plane of the paper in FIG. 6).

In FIG. 6 a workpiece P of rectangular configuration is assumed to be lying loosely at the center C of the square. Four tactile members assumed to be attached to the lower ends of the springs are represented at 90d, 91d, 92d, 93d each just touching workpiece P. Hence FIG. 6 assumes that a given amount of tension has been applied to the four cords, moving the tactile members into engagement with the workpiece.

Each of the tactile members is assumed to be slightly compressible, formed of rubber, for example. It should be noted that members 91d, 92d and 93d are each shown with a circular periphery, but that member 90d is shown provided with a flat face f. Assume, for a moment, however, that member 90d also has a completely circular periphery. With that assumption it will be apparent that applying increased tension to the cords would merely result in the four tactile members being urged with more force against the workpiece. With four members symmetrically disposed about the workpiece and applying equal forces directed toward the center of the workpiece a balance of forces would exist, with no movement of the workpiece.

However, with flat face f provided on member 90d, as increasing cord tension causes the compressible member 90d to be urged more tightly against the workpiece, the reaction force which the workpiece applies to member 90d becomes not directed toward the relaxed axis of spring 90, but rather in a direction perpendicular to face f, in a direction such as that shown by arrow $F_{90}$, for example. With such an imbalance of forces it will become apparent that member 90d will begin to move counterclockwise about the periphery of the workpiece. As soon as member 90d begins to move counterclockwise, that results in imbalances of the forces applied to members 90d, 92d and 93d causing them to similarly move counterclockwise about the periphery of the workpiece, until a new balance of forces is established. As the tactile members move counterclockwise about the workpiece, moving the lower ends of the springs horizontally further away from underneath the fixed top ends of the springs, that necessarily causes the lower ends of the springs and the tactile members to rise. Thus the application of increased cord tension after the tactile members engage the workpiece causes the tactile members to lift and rotate the workpiece.

In FIG. 6 the attachment points at the lower ends of the springs each swing inwardly and upwardly in a respective plane until the tactile members engage the workpiece, but thereafter the lower ends move along different paths in different planes as the workpiece is lifted and rotated. In order to provide such lifting and rotation, it is necessary that bending of the coil springs not be constrained to occur in single respective planes.

In FIG. 7 portions of an alternative form of article manipulator are shown, with a trio of coil springs 100-102 depending from a frame member 20'. The cord tie points are arranged in the manner discussed with respect to points 10c, 11c, and 12c in FIG. 2, so that applying tensions to cords within the springs move the lower ends of the springs away from the center of an equilateral triangle. In FIG. 7 the springs are shown deflected outwardly so that rubber tactile members on the lower ends support a workpiece RW which is shown as a simple ring. It will be apparent that the cords of the manipulator of FIG. 5 may be arranged to provide outward motion, to pick up and rotate a workpiece having an internal recess, as illustrated in FIG. 7.

Figure 8A:
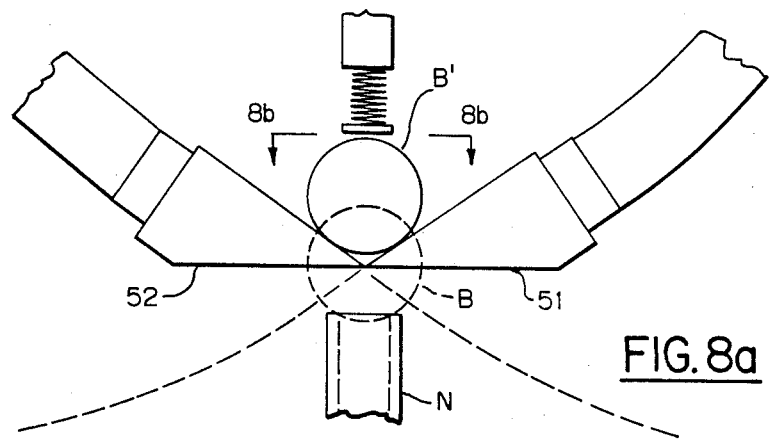
FIG. 8a is an elevation view of a portion of a further modified form of the invention useful for lifting and cradling objects.
Figure 8B:
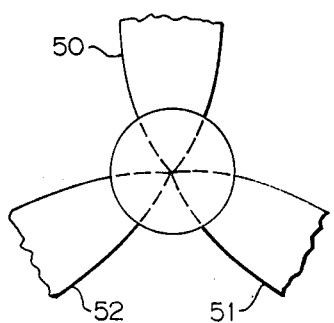

In some applications it is desirable to lift fragile objects or workpieces and to apply minimum pressures or forces against the objects. In accordance with one alternative embodiment of the invention illustrated in FIGS. 8a and 8b, a workpiece shown as comprising a ball is initially seated atop a tube N which has a recess at its upper end, with the ball occupying the position shown in dashed lines at B in FIG. 8a. A trio of coil springs carry tactile members 50, 51, 52 at their lower ends. As tensions are applied to the cords associated with the coil springs, the tactile members swing inwardly toward the center of an equilateral triangle and upwardly. The arcuate paths along with the tips of members 51, 52 swing are shown by dashed line arcs. In FIGS. 8a and 8b the tactile members are shown in a final or limit inward position where they engage each other below the ball, which then lies in the position shown in cited lines at B'. Thus the tactile members approach the ball and lift it by cradling it, so that only small forces are imparted to the ball workpiece. In FIG. 8a the ball is shown pressed against pad 41 affixed to spring 40 of a capacity sensor tip, to cause compression of spring 40 during a terminal portion of the lifting of the ball.

In some uses of the invention, capacitive sensing of manipulator vs. workpiece position will not be required, of course, so that the capacitive sensing apparatus may be eliminated. Unlike the operation of previously described embodiments, the tactile members of this alternative embodiment (FIG. 8a and 8b) each swing in only one plane.

In order for the tactile members to lift a workpiece by cradling it as in FIGS. 8a and 8b, it will be seen to be necessary that the workpiece be seated atop a pedestal or rest such as tube N, and that it extend outwardly from the seat.

While the invention has been described in connection with a motor-positioned manipulator which is motor activated to grasp and lift workpieces, such as apparatus which might be used at or near a conveyor on an assembly line, for example, it will become apparent that the invention may find a wide variety of other uses. For example, the invention may find utility as substitute for a human hand for a person who has lost a hand, or for a person whose hands function unsatisfactorily because of a space suit, for example. Grasping and lifting of objects, and lowering and releasing of objects can be provided by simple provision of pulling and relaxing of plural ends.

The cords which extend through the springs may take a variety of forms, ranging from cloth threads in some delicate applications to metal wires or cables in other applications, and what have been termed flexible cords may include plural successive sections, some of which are even rigid, in various applications. The term "cords" is used in the claims with that breadth.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

I claim:

1. An article manipulator for grasping, lifting and rotating a workpiece, comprising, in combination:

a plurality of three coil springs each having first and second ends and comprising a plurality of turns normally encircling a respective coil axis, said first ends of said springs being fixedly spaced apart from each other in the pattern of an equilateral triangle; a plurality of tactile members each affixed to a respective second end of a respective one of said coil springs;

a plurality of cords extending through said springs to move said tactile members toward respective portions of said workpiece; and means for applying tensions to said cords throughout a first stage of operation during which said tactile members move in first respective planes toward said workpiece into engagement with said workpiece and a second stage of operation during which said tactile members move in second respective planes to lift and rotate said workpiece;

each of said tactile members having a circular surface adapted to engage said workpiece, and wherein said cords are connected to cause said tactile members to move along lines offset from the center of the pattern defined by the first ends of said springs; the attachment points of said cords to said springs being displaced in the same direction from lines extending between the relaxed axes of the springs and the center of said pattern, whereby as increasing tension is indirectly applied to the cords, the tactile members do not move toward the center of said pattern but rather along said offset lines.

2. An article manipulator for grasping, lifting and rotating a workpiece, comprising in combination:

at least a trio of coil springs each having first and second ends and comprising a plurality of turns normally encircling a respective coil axis, said first ends of said springs being fixedly spaced apart from each other to form a pattern; a plurality of tactile members each affixed to a respective second end of a respective one of said coil springs;

a plurality of cords extending through said springs to move said tactile members toward respective portions of said workpiece; and means for applying tensions to said cords throughout a first stage of operation during which said tactile members move in first respective planes toward said workpiece into engagement with said workpiece and a second stage of operation during which said tactile members move in second respective planes to lift and rotate said workpiece;

each of said tactile members having a circular surface adapted to engage said workpiece, and wherein said cords are connected to cause said tactile members to move along lines toward the center of said pattern; at least one of said tactile members being provided with a workpiece-engaging surface angularly canted from the direction in which said tactile member moves toward said workpiece, whereby increased cord tension upon contact between the tactile members and the workpiece causes an imbalance of forces due to the contact of the canted surface relative to the workpiece which permits the contact members to lift and rotate the workpiece until a new balance of forces is established.

3. The manipulator of claim 1 wherein each of said cords is attached to a respective spring at a location radially displaced from the coil axis of the spring.

4. The manipulator of claim 1 wherein each of said cords is attached to a respective one of said tactile members.

5. The manipulator of claim 1 wherein said means for applying tensions to said cords comprises a moveable member to which each of said cords is tied, and motive means for moving said movable member to apply tensions simultaneously to each of said cords.

6. The manipulator of claim 1 having sensor means for sensing capacitance between said sensor means and surrounding objects; motive means for moving said coil springs and said sensor means collectively toward a workpiece, and capacity-sensitive switching means responsive to said sensor means for stopping said motive means.

7. The manipulator of claim 1 wherein said tactile members are formed of compressible material.

8. The manipulator of claim 6 wherein said sensor means includes a rigid conductive probe rod having an end and a probe tip electrically and mechanically connected to said end of said probe rod by a spring.

9. The manipulator of claim 6 wherein said sensor means comprises a conductive probe member having an end, and a first conductive ring spaced from and encircling said probe member at a first distance from said end of said probe member.

10. The manipulator of claim 9 having a second conductive ring spaced from and encircling said probe member at a second distance from said end of said probe member.

* * * * *